No. 883,710. PATENTED APR. 7, 1908.
G. FRENTZEN.
MUD WING FOR MOTOR VEHICLES.
APPLICATION FILED JAN. 16, 1906.
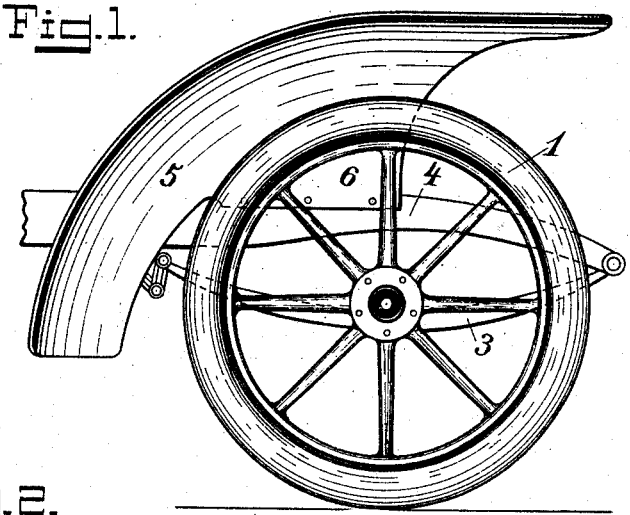
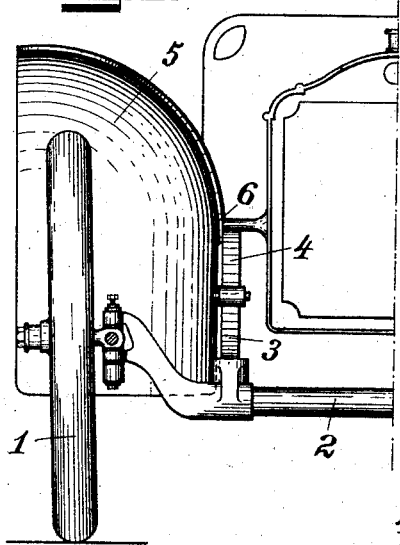
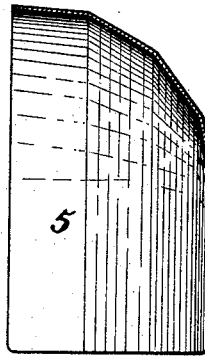
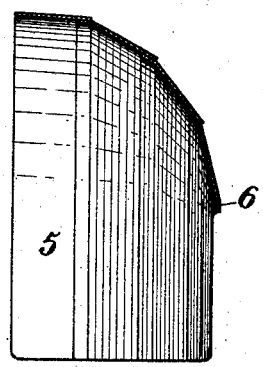
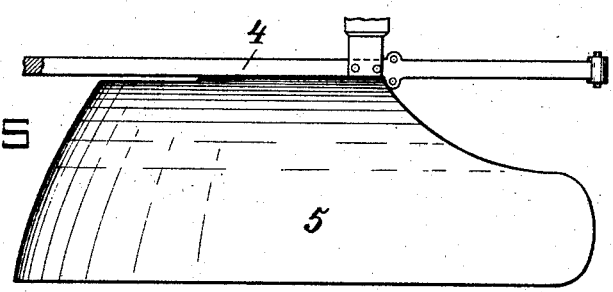
Witnesses:
F. G. Harder.
Jos. Schnitzler.
Inventor:
Georg Frentzen
per Martin Schmetz
Attorney.

UNITED STATES PATENT OFFICE.

GEORG FRENTZEN, OF AIX-LA-CHAPELLE, GERMANY.

MUD-WING FOR MOTOR-VEHICLES.

No. 883,710.　　　Specification of Letters Patent.　　　Patented April 7, 1908.

Application filed January 16, 1906. Serial No. 296,401.

*To all whom it may concern:*

Be it known that I, GEORG FRENTZEN, professor and royal government building-master, a subject of the King of Prussia, residing at Aix-la-Chapelle, Haus Waldheim am Rothagerweg, in the Kingdom of Prussia, Empire of Germany, have invented certain new and useful Improvements in Mud-Wings for Motor-Vehicles; and I do hereby declare the following to be a full, clear, and exact description of the invention, such as will enable others skilled in the art to which it appertains to make and use the same.

My present invention relates to mud-wings designed especially for motor-vehicles and the object in view is, to prevent the mud flung from the wheels of a motor-vehicle from reaching those parts of the vehicle lying sidewise and back of the wheels.

In the acccompanying drawing:—Figure 1 is a side elevation of a part of the fore-part of a motor-vehicle equipped with the improved mud-wing. Fig. 2 is a front elevation of the mud-wing and parts of the vehicle, showing the mud-wing bent on a continuous line. Figs. 3 and 4 are transverse sectional views of modifications of the mud-wing. Fig. 5 is a plan view of the mud-wing and parts of the vehicle-frame.

The wheel 1 is connected in a well known manner with the axle 2 attached to the spring 3, which in turn supports the beam 4 of the vehicle-frame. To this beam the longitudinally and crosswise bent mud-wing 5 is secured. Longitudinally said mud-wing is bent in a vertical plane lying at right angles to the axle 2 (Fig. 1) and crosswise in a plane lying parallel to said axle, or at right angles to the first-named plane (Figs. 2, 3 and 4). The bending of the mud-wing in the plane lying parallel to the axle 2 may be executed in different manners, either to form a continuous line, as shown in Fig. 2, or to form a broken line, as shown in Figs. 3 and 4. In the latter case the different flat faces may be formed of different crosswise angularly bent strips of sheet-metal riveted or fastened in any other suitable manner to each other. The mud-wing surrounds the upper and rearward portions of the wheel 1 towards the vehicle side. The lateral member 6 of the mud-wing not only affords increased protection to the vehicle but also serves for attaching said mud-wing to the motor-vehicle and may either reach down to the vehicle-frame, as for instance shown in Fig. 1, or it may be extended to any point below it, if desirable. A mud-wing thus constructed will effectively prevent that any mud flung from the wheel reaches any parts of the vehicle lying back and sidewise of said wheel, a result unattainable with any mud-wings now in use, because of the free space left between the mud-wings and the vehicle-body. This advantageous and practical result is particularly apparent in its true light when the wheels take up an angular position towards the vehicle-body, as for instance when the vehicle describes sharp curves or is wheeled around.

I claim:—

1. A mud-wing for motor-vehicles consisting of a rigid body substantially inclosing with its longitudinally curved part the rearward upper quadrant of a front-wheel of a motor-vehicle, and transversely bent to terminate in an integral lateral member for securing said mud-wing to the vehicle-body and to admit of said front-wheel taking up any desirable angular positions within said body.

2. The combination with a motor-vehicle-frame and a wheel supporting it, of a mud-wing consisting of a rigid body substantially inclosing with its longitudinally curved part the rearward upper quadrant of a front-wheel of a motor-vehicle, and transversely bent to terminate in an integral lateral member for securing said mud-wing to said motor-vehicle-frame and to admit of said front-wheel taking up any desirable angular positions within said body.

In testimony whereof I have signed my name to this specification in the presence of two subscribing witnesses.

GEORG FRENTZEN.

Witnesses:
　HENRY QUADFLIEG,
　KARL MÖLLER.